Aug. 15, 1950  D. T. HOLLINGSWORTH  2,518,892
WAVE GUIDE FOR HIGH-FREQUENCY ELECTRIC CURRENTS
Filed Jan. 11, 1946
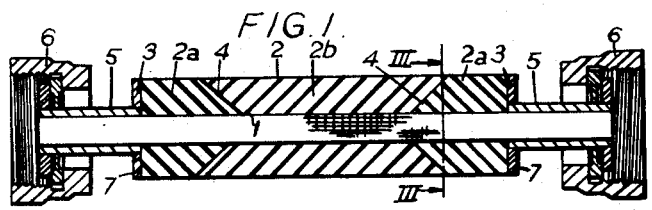
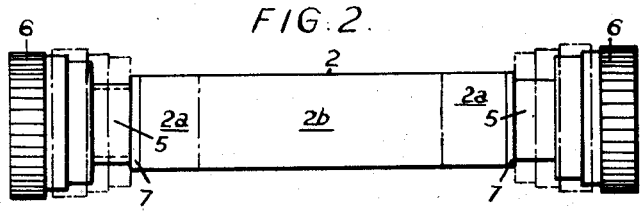
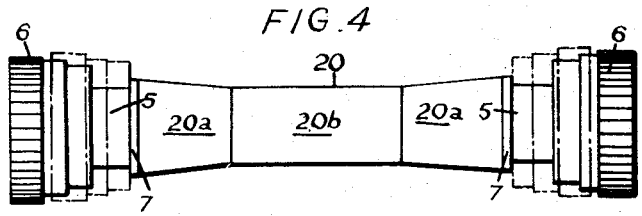
*Inventor*
DOUGLAS TAFT HOLLINGSWORTH
By Hooper, Leonard & Glenn
His Attorneys Patented Aug. 15, 1950

2,518,892

UNITED STATES PATENT OFFICE 2,518,892

WAVE GUIDE FOR HIGH-FREQUENCY ELECTRIC CURRENTS

Douglas Taft Hollingsworth, London, England, assignor to British Insulated Callender's Cables Limited, London, England, a British company Application January 11, 1946, Serial No. 640,491
In Great Britain November 17, 1944

Section 1, Public Law 690, August 8, 1946
Patent expires November 17, 1964

5 Claims. (Cl. 138—49)

This invention relates to wave guides for high frequency electric currents and, in particular, to longitudinally flexible wave guides of hollow form and rectangular internal cross-section provided with a covering of rubber as hereinafter defined, moulded on to the external surfaces of the wave guide walls and vulcanised or otherwise toughened in position. The guide may be of woven wire fabric of fine mesh accurately shaped to enclose a rectangle of the required dimensions and held yieldingly in this form by the rubber covering. The addition of the rubber covering permits the guide to have sufficient flexibility combined with a minimum distortion of cross-section to permit it to undergo bending and/or twisting within desired limits without great loss of electrical efficiency. A length of such wave guide may, for instance, be required for connection between two lengths of rigid guide on two parts of a structure between which relative movement can take place from time to time. The present invention adapts the guide more effectively to such duty.

In accordance with the invention a length of guide of the kind indicated is made with less flexibility at and near the ends than in the central part by varying the character of the rubber used for the supporting covering. This variation can be produced by utilising such rubber compounds as have, after vulcanisation, different values of hardness. They may, for instance, range from a value of 70 measured on a Shore durometer at the ends of the guide length to a value of 50 in the central part. Grades may be employed between the two extreme values but in general it appears that sufficient graduation of flexibility can be obtained by using two grades and preferably applying them either so that they overlap with a tapering joint, or so that a greater thickness is applied at the ends, where the harder material is found, tapering off to a smaller thickness in the regions where it joins the softer material.

The effect of the invention is to provide that during bending or twisting the greater part of the relative displacement of adjacent parts of the guide length takes place in the region away from the ends of the guides falling off to a very small amount in the region where the length of guide is attached to the rigid parts which form the adjacent co-operating lengths.

The variation in the quality of the rubber indicated above can readily be obtained by known means by adjusting the ingredients and method of manufacture. The rubber will generally be applied in the form of uncured dough or tape outside the conductive walls of the guide while they are supported on a rectangular former. The curing of the dough or tape in position causes it to become bonded to the guide so that the two move together under bending or twisting forces.

An example of a flexible wave guide constructed in accordance with the invention is shown in the accompanying drawings, wherein:

Figure 1 is a longitudinal section of a complete length of the wave guide,

Figure 2 is a plan of the guide lengths shown in Figure 1,

Figure 3 is a cross-section of the guide taken on the line III—III of Figure 1, and Figure 4 is a view similar to Figure 2 of an alternative construction.

Referring particularly to Figures 1 to 3, the guide comprises a tube 1 (shown diagrammatically in Figures 1 and 3 only) of woven wire fabric of fine mesh and of rectangular cross-section, embedded in the wall of a moulded covering 2 of rubber. This covering is built up of three sections. The two end sections 2a, which are the first to be applied to the tube, are short lengths, each with a flat outer end face and a tapered inner end 4. Each of the sections 2a is of rubber having, after vulcanisation, a hardness of 60–70 as measured on a Shore durometer. The central section 2b, which is applied after the end portions, bridges the gap between them. It has a hardness, after vulcanisation, of 40–50. The several parts of the covering are applied in dough form and their overlapping tapered surfaces united by simultaneously vulcanising the several parts.

The drawings also show the preferred means for securing a wave guide coupling to this form of guide. The flanged tube 5 carrying the coupling nut 6 is soldered to a washer 7 on to the rear face of which is vulcanised the end face 3 of the moulded covering 2.

In an alternative form of construction as shown in Figure 4, the moulded rubber covering 20 is formed with a central section 20b of less thickness than the extremities of the harder rubber end parts 20a. The end parts 20a taper off from the thicker extremities to a smaller thickness where they join the softer material of the thinner central section 20b.

It is to be understood that the term "rubber" used herein is not to be limited to natural rubber. The function of the "rubber" is to provide a covering and binding for the walls of the hollow guide which gives a strong but yielding support to the guide and which can be moulded thereon. In addition to natural rubber various synthetic rubbers and rubber-like materials having the required properties may be used. They may be capable of application in the cold followed by hardening and toughening by a heat treatment analogous to vulcanisation in its effect, or they may be thermoplastic and applied hot regaining their toughness and comparative hardness on cooling. Accordingly, where the context permits, the term "rubber" is to be interpreted as including such synthetic rubbers and rubber-like materials having the required properties.

What I claim as my invention is:

1. A length of flexible wave guide of rectangular internal cross-section having moulded on the external surface of the wave guide a rubber covering comprising a portion at each end of the length of harder rubber than the intervening central portion, whereby the length of covered wave guide is less flexible at its ends than in its central part.

2. A length of flexible wave guide of rectangular internal cross-section having moulded on its external surface a rubber covering consisting of a central and two end portions, the two end portions being of harder rubber than that of the central portion between them and joined to the said central portion by overlapping joints of tapered form.

3. A length of flexible wave guide of rectangular internal cross-section having moulded on to its external surface a rubber covering consisting of two end portions and an intervening portion each of the two end portions being of harder rubber than that of the intervening portion and of greater thickness than the said intervening portion and tapering off to a smaller thickness where the end part joins to the softer material of the central part.

4. A length of flexible wave guide comprising a tube of woven wire fabric of fine mesh and of rectangular cross-section, and a moulded rubber covering in the wall of which said tube is embedded, said covering being built up of three sections, each of which is jointed to its neighbouring section by an overlapping joint of tapered form, the end sections being of harder rubber than the intervening central section.

5. A length of flexible wave guide comprising a tube of woven wire fabric of fine mesh and of rectangular cross-section and a moulded rubber covering therefor in the wall of which said tube is embedded, said covering being built up of three sections each of which is jointed to its neighbouring section by an overlapping joint of tapered form, the end sections being of rubber having a hardness of 60–70 measured on a Shore durometer and the intervening central portion being of rubber having a hardness of 40–50 measured on a Shore durometer.

DOUGLAS TAFT HOLLINGSWORTH.

REFERENCES CITED

The following references are of record in the file of this patent:

UNITED STATES PATENTS

| Number | Name | Date |
| --- | --- | --- |
| 1,365,809 | Atwood | Jan. 18, 1921 |
| 2,383,645 | Hahn | Aug. 28, 1945 |
| 2,416,177 | Hollingsworth | Feb. 18, 1947 |